UNITED STATES PATENT OFFICE.

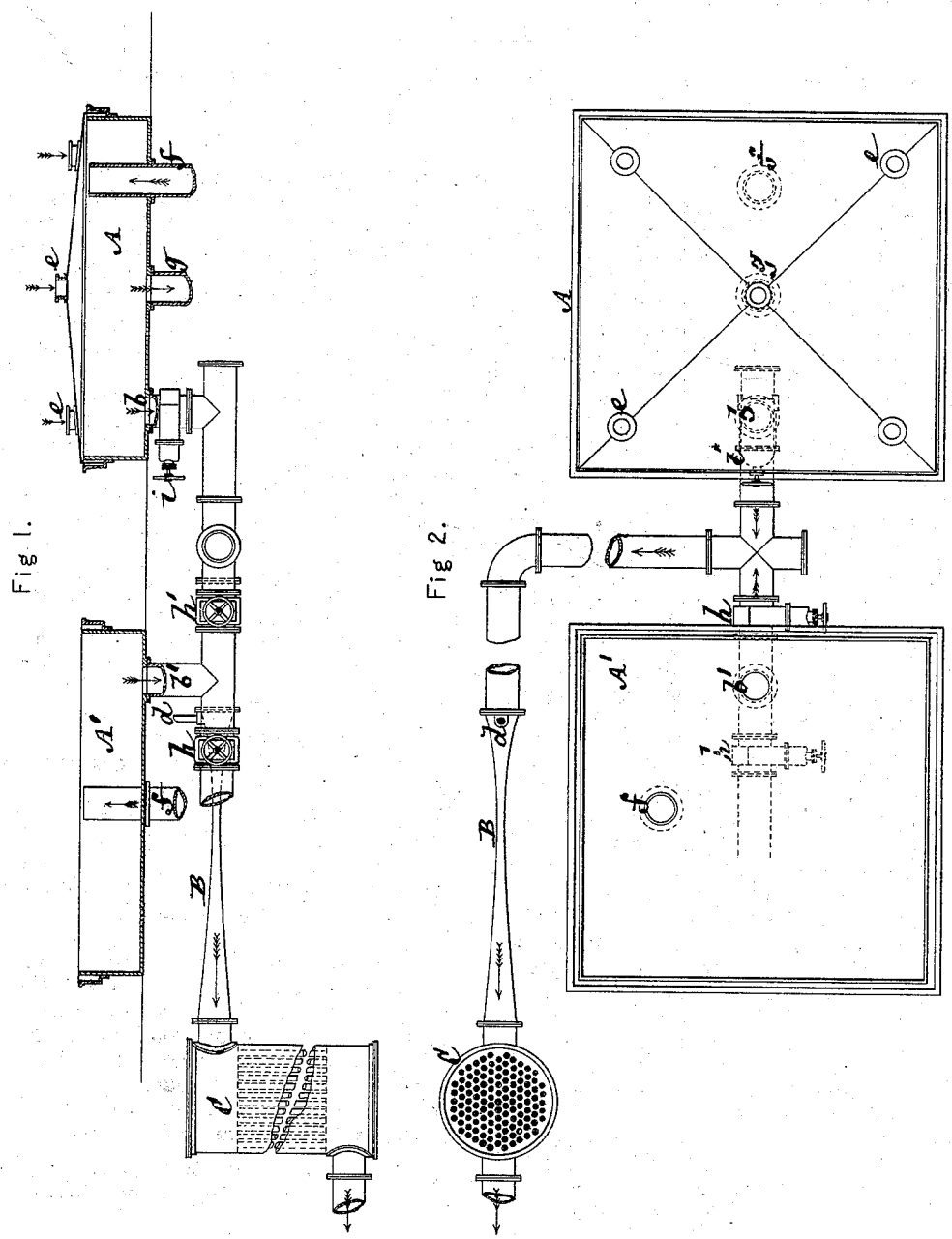

PHILIP W. MACKENZIE, OF BLAUVELTVILLE, AND CHARLES W. ISBELL, OF NEW YORK, N. Y.

IMPROVEMENT IN THE PROCESSES OF DEODORIZING PURIFYING MATERIALS OF GAS-WORKS.

Specification forming part of Letters Patent No. 152,660, dated June 30, 1874; application filed March 17, 1874.

*To all whom it may concern:*

Be it known that we, PHILIP W. MACKENZIE, of Blauveltville, in the county of Rockland and State of New York, and CHARLES W. ISBELL, of the city, county, and State of New York, have invented a new and Improved Process of Deodorizing and Reviving Purifying Materials Used in the Purifying-Boxes of Gas-Works, of which the following is a specification:

In the ordinary process of deodorizing and reviving the purifying materials used in the purifying-boxes of gas-works the foul lime is deodorized, or the oxide of iron revived, by merely blowing or producing a current of air through the purifier. This current, in carrying off the ammonia and the sulphur from the foul lime or oxide of iron, causes a most noxious effluvia to escape into and impregnate the surrounding atmosphere. The general object of our invention is to obviate this, to which end our invention consists, generally, in introducing steam into the exhaust pipe or outlet, which steam, in condensing, having been intimately diffused in the exhauster among the air which is passed through the boxes impregnated with the sulphur and ammonia, carries down with it the ammonia and sulphur, and so prevents the noxious effluvia from passing into the surrounding atmosphere.

To carry out our improved process of deodorizing or reviving the purifying materials without removing them from the purifying-boxes various means or combinations of means may be employed; but we prefer to use an apparatus substantially as represented in the accompanying drawing, and which it is our intention to make the subject of a separate application for Letters Patent.

Figure 1 is a partly-sectional elevation of said apparatus in connection with the purifying-boxes, and Fig. 2 is a plan of the same.

A A' are purifying-boxes containing the foul lime or oxide of iron to be purified. Connected with the exhaust or air outlets $b$ $b'$ is a steam-jet exhauster, B, of any suitable construction, and communicating with a condenser, C. Said exhauster has its inlet at $d$. The purifying-box A is of the old or ordinary construction, $e$ $e$ being the air-inlets, $f$ the gas-inlet, and $g$ the gas-outlet. The other purifying-box, A', is represented as of a new or special construction, $f$ being the gas-inlet, and $b'$ serving, not only as the air-outlet when deodorizing, but also as the gas-outlet. Valves $h$, $h'$, and $i$ are provided to control the proper action of the apparatus. The several arrows indicate the direction of the respective currents of air, gases, or vapors.

The process involved in the use of this or similar apparatus, and which, irrespective of any special combination of parts, consists in drawing air through the purifiers by a steam-jet exhauster, so that the gas or vapors contained in said air are absorbed by the water of condensation from the steam-jet, thus attains the general object of the invention in a very perfect and simple manner.

The water of condensation from the condenser C may escape into a sewer, or be collected and treated for the recovery of the ammonia.

We do not claim exhausting the air from retorts and conducting it through a pipe into the purifier and washer by means of a steam-jet, for such is set forth in the patent granted to P. W. Mackenzie, May 30, 1871.

We claim—

The process of drawing air through the purifier by a steam-jet exhauster, whereby the currents of air brought through the purifier are mingled with the steam from the exhauster, and the gas or vapors with which the air is charged are absorbed or taken up by the water of condensation resulting from the steam-jet, substantially as herein described.

P. W. MACKENZIE.
CHAS. W. ISBELL.

Witnesses:
HENRY T. BROWN,
MICHAEL RYAN.